US010111281B2

(12) United States Patent
Qiu

(10) Patent No.: US 10,111,281 B2
(45) Date of Patent: Oct. 23, 2018

(54) INTELLIGENT CONTROLLER AND METHOD FOR ELECTRONIC CIGARETTE

(71) Applicant: Joyetech (Changzhou) Electronics Co., Ltd., New District Changzhou (CN)

(72) Inventor: Weihua Qiu, Jiangsu (CN)

(73) Assignee: Joyetech (Changzhou) Electronics Co., Ltd., New District Changzhou (CN)

( * ) Notice: Subject to any disclaimer, the term of this patent is extended or adjusted under 35 U.S.C. 154(b) by 833 days.

(21) Appl. No.: 14/602,948

(22) Filed: Jan. 22, 2015

(65) Prior Publication Data

US 2015/0173124 A1 Jun. 18, 2015

Related U.S. Application Data

(63) Continuation of application No. PCT/CN2012/086607, filed on Dec. 14, 2012.

(30) Foreign Application Priority Data

Nov. 13, 2012 (CN) .......................... 2012 1 0455135

(51) Int. Cl.
H05B 1/02 (2006.01)
A24F 47/00 (2006.01)
G06F 13/38 (2006.01)

(52) U.S. Cl.
CPC ......... *H05B 1/0244* (2013.01); *A24F 47/008* (2013.01); *G06F 13/387* (2013.01)

(58) Field of Classification Search
CPC .... A24F 47/008; G06F 13/387; H05B 1/0244
See application file for complete search history.

(56) References Cited

U.S. PATENT DOCUMENTS 6,766,220 B2 7/2004 McRae et al.
2003/0154991 A1 8/2003 Fournier et al.
(Continued)

FOREIGN PATENT DOCUMENTS

CN 101019694 A 8/2007
CN 201352950 Y 12/2009
(Continued)

OTHER PUBLICATIONS

International Search Report dated Aug. 22, 2013 in International Application No. PCT/CN2012/086607.
(Continued)

*Primary Examiner* — Shogo Sasaki
(74) *Attorney, Agent, or Firm* — Saliwanchik, Lloyd & Eisenschenk

(57) ABSTRACT

An intelligent controller of electronic cigarette includes a switch module, a voltage acquisition module coupled to a heating wire, a control module coupled to the switch module and the voltage acquisition module, respectively, a display module electrically connected to an output of the control module, and a battery electrically connected to the switch module, the voltage acquisition module, the control module and the display module, respectively. The control module sends a control signal to the voltage acquisition module to make the voltage acquisition module acquire a terminal voltage of the heating wire. After receiving a signal from the switch module, whether the heating wire of an atomizer is in a short-circuit condition, an open-circuit condition or a normal condition is detected based on the acquired signal, and a detection result is output such that these conditions of the heating wire are observed directly by users.

10 Claims, 11 Drawing Sheets

(56) References Cited

U.S. PATENT DOCUMENTS

| | | | |
|---|---|---|---|
| 2011/0265806 A1* | 11/2011 | Alarcon | A24F 47/00 131/273 |
| 2013/0104916 A1* | 5/2013 | Bellinger | A61M 11/041 131/328 |
| 2014/0014126 A1* | 1/2014 | Peleg | A24F 47/008 131/329 |
| 2014/0182609 A1* | 7/2014 | Liu | A24F 47/008 131/329 |
| 2014/0230835 A1* | 8/2014 | Saliman | A24F 47/008 131/329 |
| 2014/0258741 A1* | 9/2014 | Xiang | G06F 1/26 713/300 |
| 2014/0345635 A1* | 11/2014 | Rabinowitz | A24B 15/16 131/352 |
| 2015/0090277 A1* | 4/2015 | Xiang | A24F 47/008 131/328 |
| 2016/0058074 A1* | 3/2016 | Liu | A24F 47/008 131/329 |
| 2016/0143359 A1* | 5/2016 | Xiang | A24F 47/008 392/387 |

FOREIGN PATENT DOCUMENTS

| | | |
|---|---|---|
| CN | 201878765 U | 6/2011 |
| CN | 202233002 U | 5/2012 |
| CN | 102727969 A | 10/2012 |
| CN | 202890465 U | 4/2013 |

OTHER PUBLICATIONS

Supplementary European Search Report dated May 30, 2016 in European Application No. 12888511.8.

* cited by examiner

INTELLIGENT CONTROLLER AND METHOD FOR ELECTRONIC CIGARETTE

CROSS-REFERENCE TO RELATED APPLICATIONS

This application is a continuation of International Patent Application No. PCT/CN2012/086607, filed Dec. 14, 2012, which claims priority to Chinese Patent Application No. 201210455135.8, filed Nov. 13, 2012, which are incorporated herein by reference in their entirety.

FIELD OF THE INVENTION

The present invention relates generally to an electronic cigarette, and more particularly, to an intelligent controller and a method of the electronic cigarette.

BACKGROUND

An electronic cigarette includes a battery, a control circuit, and an atomizer. When a user inhales, a high speed airflow is formed in an airflow sensor which senses the inhaling from the user's mouth to actuate an airflow sensor switch to turn on the airflow sensor switch, and the electronic cigarette enters the working status. A control module of the control circuit can control an execution unit to operate by calculating and measuring. The atomizer can be controlled by the control module, and achieve different degrees of atomization according to degrees of suction from the mouth. The atomizer includes a high frequency oscillation circuit and a heating wire. In the atomizer, a nicotine liquid with high purity can be pressurized by a superfine atomizing pump, then enters into an atomizing chamber to be critically atomized into droplets with sizes of about 0.5-1.5 μm, to be dissipated in forms of aerosols by mixing with the inhaled airflow, and form vapors that simulate a smoke gas and have an appearance similar to smoke, but is actually a fog. The condition for critical atomizing is that a surface tension of the liquid is reduced by heating to a degree that it is easiest for the liquid to be atomized, and a temperature of a normal smoke gas (50-60 degree centigrade) is simulated while the smoke fog is simulated. At the same time, an indicator light at a front section of the electronic cigarette can be illuminated to simulate light of the cigarette tip to indicate that the electronic cigarette is in operation. When the inhaling is halted, the airflow in the sensor disappears, the airflow sensor switch is turned off, the control module of the control circuit stops working, the atomizer stops working, and the indicator light at the front section of the electronic cigarette is turned off.

When an electronic cigarette has been used for a period of time, there may be failures if the nicotine liquid cannot be atomized into vapors. Because the user cannot visually observe where the trouble spot is, the user cannot repair the defect by himself. Thus, the user has to abandon the electronic cigarette or send the electronic cigarette to an after-sale service station of the vendor for overhauling. After checking, it may be determined that the heating wire is in circumstances of short circuit or open circuit. Such minor failure causing the electronic cigarette to malfunction will affect the user's degree of trust in the electronic cigarette.

SUMMARY OF THE INVENTION

In view of the above, an objective of the present invention is to provide an intelligent controller of an electronic cigarette, by which certain conditions, including a normal condition, a short-circuit condition, or an open-circuit condition, of a heating wire of an atomizer of the electronic cigarette can be directly observed by a user.

According to an embodiment, an intelligent controller of an electronic cigarette includes:

a switch module, configured to send a high voltage signal to activate the intelligent controller;

a voltage acquisition module coupled to a heating wire of an atomizer, configured to acquire a terminal voltage of the heating wire;

a control module coupled to the switch module and the voltage acquisition module, respectively, configured to send a control signal to the voltage acquisition module to drive the voltage acquisition module to acquire the terminal voltage of the heating wire, after receiving the high voltage signal from the switch module, detect whether the heating wire is in a short-circuit condition, an open-circuit condition or a normal condition, according to a type of the acquired signal from the voltage acquisition module, and output a detection result;

a display module electrically connected to an output of the control module, configured to digitally display whether the heating wire is in a short-circuit condition, an open-circuit condition, or a normal condition such that a user directly observes the condition of the heating wire; and a battery electrically connected to the switch module, the voltage acquisition module, the control module, and the display module, respectively, configured to supply working voltage power to the switch module, the voltage acquisition module, the control module, and the display module, respectively.

By adopting the above embodiment, when the control module receives the signal from the switch module to activate the intelligent controller, the control module sends a control signal to drive the voltage acquisition module to acquire the terminal voltage of the heating wire; the voltage acquisition module sends the acquired signal to the control module; the control module detects whether the heating wire is in a short-circuit condition, an open-circuit condition or a normal condition, according to the type of the acquired signal from the voltage acquisition module, and outputs the detection result, and the display module displays whether the heating wire is in a short-circuit condition, an open-circuit condition, or a normal condition for a user to observe the current condition of the heating wire directly. If there is a failure with the heating wire, the user can know the condition of the heating wire with the intelligent controller directly according to the present invention, and a small failure, such as a short circuit or an open circuit of the heating wire, can be resolved by a simple repair by the user, avoiding the adverse effect of abandoning the electronic cigarette, and thereby ensuring the trust of users in the electronic cigarette. In addition, compared with the control circuit of prior art electronic cigarettes, the intelligent controller with the above fault detection according to the present invention has an advantage of high-degree intelligence.

Preferably, the control module can be a control module storing a built-in electronic cigarette menu and storing parameters of the electronic cigarette. According to an embodiment, the intelligent controller also includes:

an input module electrically connected to an input of the control module, via which a user sends instructions to the control module to select options in the electronic cigarette menu, and sends instructions to the control module to adjust the parameters after viewing the parameters of the electronic cigarette, wherein the corresponding parameters are adjusted by the control module; and a storage module coupled to an output of the control module, configured to store data produced during smoking via the control module. According to the present invention, after the intelligent controller is activated by the switch module, the built-in electronic cigarette menu can be output, and the display module displays the electronic cigarette menu in the control module for the user to visually observe the condition of the electronic cigarette, after obtaining a control signal from the control module. The user can select start options in the menu or view parameter values in other options in the menu via the input module, or send a signal to the control module via the input module to adjust the parameter values. The control module can adjust corresponding parameter values after receiving the signal for adjustment from the input module, and output the adjusted parameter values to the display module for display.

According to the present invention, parameters can be set or adjusted via the input module after the intelligent controller is activated, and such adjustable parameters include time, date, maximum number of whiffs of one day, cumulative number of whiffs, and so on. The above parameters can be set or adjusted by a user according to his own need, so the intelligent controller according to the present invention has an advantage of high-degree intelligence.

Preferably, the intelligent controller further includes a Universal Serial Bus (USB) interface electrically connected to the control module, configured to use as an interface for data interaction between the control module and an intelligence terminal device. The control module can communicate with the intelligence terminal device through the USB interface coupled to the intelligence terminal device, to send the data stored in the storage module and produced during smoking to the intelligence terminal device. The intelligence terminal device can carry out a further analysis on the data, so the user can see the service conditions of the electronic cigarette more intuitively. The service conditions can include daily condition, weekly condition and monthly condition. These service conditions can be displayed on the intelligence terminal device in the form of graphs.

Preferably, the intelligent controller further includes a charging management module coupled to the USB interface, and electrically connected to the control module and the battery, respectively. When an external power is connected to the USB interface, the USB interface can transmit the voltage of the external power to the charging management module, and the battery can be recharged via the charging management module. Therefore, in addition to an interface for communication, the intelligent controller according to the present invention also has an interface for charging.

Preferably, the intelligent controller further includes a voltage comparison module, configured to compare an acquired voltage of the battery with a reference voltage to obtain a voltage difference, amplify the voltage difference after comparing, and send the amplified voltage difference to the control module. The voltage comparison module can compare the voltage of the battery with the reference voltage of 1.8V, amplify the voltage difference after comparing, and send the amplified voltage difference to an AD sampling interface, so that the control module can obtain a precise voltage of the battery. The voltage comparison module offsets the lack of precision of the AD sampling interface of the control module. The voltage of the battery can be output to the display module via the control module, so that the user can know the voltage of the battery accurately when the intelligent controller is at work.

Preferably, the display module includes:
a switching voltage booster coupled to the control module, configured to boost the voltage of the battery to output after acquiring the output signal of the control module; and
a display screen coupled to an output of the switching voltage booster, configured to display the condition of the heating wire output from the control module after acquiring the output voltage of the switching voltage booster.

In the intelligent controller according to a preferred embodiment of the present invention, the display screen can be an OLED display screen, wherein the display screen requires a high voltage at work Thus, boosting the voltage of the battery via the switching voltage booster can meet the voltage requirement of the display screen.

Preferably, the intelligent controller further includes a voltage stabilization module coupled to an output of the switching voltage booster, configured to convert the voltage from the switching voltage booster and provide a stable voltage to the control module. Because the intelligent controller according to the present invention has a high current (greater than 1 A) at work, there is a great voltage drop in the battery, and when the voltage of the battery is low, the voltage drop can cause the voltage of the battery to be too low, making the control module reset. The function of the voltage stabilization module is to generate a steady voltage of 3.3V to power the control module, so as to avoid the problem of the reset of the control module when the heating wire is at work. If there is no voltage stabilization module in the intelligent controller according to the present invention, the control module can be reset when the battery operates at about 3.6V. Because of the voltage stabilization module, the intelligent controller will still work even if the voltage of the battery is decreased to 3.3V or below.

Preferably, the intelligent controller further includes an output voltage adjustment module coupled to the control module, configured to adjust a voltage output from the output voltage adjustment module to the heating wire of the electronic cigarette to a voltage defined by a user, according to a pulse width modulation signal output from the control module based on a signal for adjusting the output voltage from the input module. After startup of the intelligent controller according to the present invention, users can make the decision whether or not the voltage should be adjusted, based on the voltage displayed on the display module and their practical demands. The detailed process of the adjustment is that the input module is operated to send a user-defined voltage signal, the control module calculates and sends a pulse width modulation signal to the output voltage adjustment module after receiving the user-defined voltage signal, and the voltage output from the output voltage adjustment module can be adjusted to the voltage defined by the user. The intelligent controller according to the present invention can adjust the output voltage within a given voltage range, and it offers advantages that it can avoid a situation that the temperature of the heating wire is not high enough to make the nicotine liquid be atomized completely, so as to get the best effect of smoking experience; and it can avoid the burning out of the heating wire caused by the heating wire withstanding a large voltage or current.

Also described herein is an intelligent control method for electronic cigarette, including:
step S1, sending, by a switch module, a high voltage signal of startup to a control module;
step S2, receiving, by the control module, the high voltage signal of startup from the switch module, sending a control signal to a voltage acquisition module to make the voltage acquisition module acquire a terminal voltage of the heating wire, detecting whether the heating wire of an atomizer is in a short-circuit condition, an open-circuit condition, or a normal condition, according to the type of the acquired signal from the voltage acquisition module, and outputting a detection result; and step S3, digitally displaying, by a display module, an output signal from the control module to show whether the heating wire is in a short-circuit condition, an open-circuit condition, or a normal condition for users to observe the current condition of the heating wire directly.

By adopting the above embodiments, when the control module receives a signal from the switch module to activate the intelligent controller, the control module sends a control signal to make the voltage acquisition module acquire the terminal voltage of the heating wire, the voltage acquisition module sends the acquired signal to the control module, the control module detects whether the heating wire is in a short-circuit condition, an open-circuit condition, or a normal condition, according to the type of the acquired signal from the voltage acquisition module, and output the detection result; and the display module displays whether the heating wire is in a short-circuit condition, an open-circuit condition, or a normal condition for users to observe the current condition of the heating wire directly. If there is a failure in the heating wire, users can know the condition of the heating wire via the intelligent controller directly according to the present invention, and a minor malfunction, such as a short circuit or an open circuit of the heating wire, can be resolved by a simple repair by the users, avoiding the adverse effect of abandoning the electronic cigarette, and thereby ensuring the trust of users in the electronic cigarette. In addition, compared with the control circuit of prior art electronic cigarettes, the intelligent controller with the above fault detection according to the present invention has an advantage of high-degree intelligence.

Preferably, in the step S2, a built-in electronic cigarette menu in the control module can be output to the display module, while the condition of the heating wire of the atomizer that the heating wire is in a short-circuit condition, an open-circuit condition, or a normal condition is output to the display module. Once the electronic cigarette menu is displayed by the display module of step S3, the following additional steps can occur:

Step S4, selecting, via an input module, start options in the menu, viewing parameter values in other options in the menu, or sending a signal to the control module to adjust the parameter values, wherein the control module can adjust the corresponding parameter values after receiving the signal for adjustment from the input module, and output the adjusted parameter values to the display module for display. The options in the menu displayed can include: booting up; making the device enter a low-power standby state; reading the capacity of the battery; the time for the screensaver to show; the delay time for making the device enter a low-power standby state; checking and setting the time; checking the cumulative number of whiffs of the device, setting a maximum limit for the number of whiffs per day, and resetting the current number of whiffs; and viewing information of the device including resistance of the heating wire, user information, and the device's serial number. If the user selects the option of booting up to make the intelligent controller enter booting up mode, the intelligent controller can return to the menu interface to select from the rest of the options via a five-time-switching-on of the switch module of step S1. If the user selects to boot up the intelligent controller, LOGO of the vendor, calendar, and main interface are displayed on the display module in a sequence. The information presented on the main interface includes current number of whiffs, remaining number of whiffs, the remaining capacity of the battery, output voltage, and indicating arrow for adjustment of the voltage output.

Preferably, before the step of S1, it can further include:

step Q1, detecting, by the control module, whether a USB interface is connected with a power supply unit with an output voltage, for example, of 5V, if the result of the detection is no, then proceeding to S1, and if the result of the detection is yes, proceeding to step Q2; and step Q2, determining, by the control module, whether the power supply unit connected with the USB interface is an intelligence terminal device, if the result of determination is no, then recharging the battery, and if the result of determination is yes, establishing a communication with the intelligence terminal device.

Preferably, the way to send a valid activating signal from the switch module by sending a high voltage signal is by switching on the switch module B times in A second(s), and the time for one switching on is less than C second(s). The way of switching on the switch module B times in A second(s) can help prevent the wrong operations by users.

Preferably, the method can further include: acquiring, by a voltage comparison module, the voltage of the battery, comparing the acquired voltage of the battery with a reference voltage in the voltage comparison module to obtain a voltage difference, amplifying the voltage difference after comparing, and sending the amplified voltage difference to the control module; and converting, by the control module, the amplified voltage difference to get an actual value of the voltage of the battery, obtaining a remaining number of whiffs for the current voltage of the battery according to the actual value of the voltage and the output voltage needed for one switching on the switching module, and outputting the voltage of the battery and the remaining number of whiffs to the display module for users to observe the current voltage of the battery and the remaining number of whiffs directly. In this way, it helps users to have a good control over the using of the battery.

Preferably, in step S4, if the option of booting up in the menu is selected, the method further includes:

step S5, if the control module does not detect a high voltage signal from the switch module for one switching on in D second(s), the control module controlling the intelligent controller to enter a standby state, and if the control module detects a high voltage signal from the switch module for one switching on in D second(s), then proceeding to S6; and step S6, the control module controlling a voltage adjustment module to supply power to a load so that the user can smoke the electronic cigarette.

After the booting up of the intelligent controller, there are two choices when entering into the menu, one is for viewing or changing parameters, the other is to start up to enter a smoking operation. When entering the smoking operation, the switch module should be switched on, and the control module only needs to send a control signal to make the battery supply power to the heating wire of the atomizer when receiving a high voltage signal from the switch module for one switching on.

Preferably, parameters of the electronic cigarette in the control module include the parameter of the maximum number of whiffs of one day, so between the step S51 and S6, it further includes a step S52 of detecting whether the number of whiffs of the day reaches the maximum number of whiffs, if the detected result of S51 is yes, then the control module controls the intelligent controller to enter a standby state, and if the detected result of S51 is no, then proceeding to S6. If the number of whiffs of the day reaches the maximum number of whiffs of one day, the electronic cigarette will no longer permit the user to smoke and automatically enter the standby state, and the user can check the parameters of the electronic cigarette through operations, thus it helps to ensure the user's health.

Preferably, after supplying power to the load of step S6, it further includes:

step S7, detecting, by the control module, whether the switch module is switched off, if the result of the detection is yes, the intelligent controller entering the standby state, and if the result of the detection is no, proceeding to step S8;

step S8, detecting, by the control module, whether the switch module is switched on for F second(s), if the result of the detection is no, the intelligent controller entering the standby state, and if the result of the detection is yes, proceeding to step S9; and step S9, outputting, by the control module, a control signal to stop supplying power to the load.

When the battery supplies power to the heating wire for extended periods, it is not beneficial for saving the capacity of the battery and it is unable to guarantee the life of the heating wire, so it is beneficial to save the capacity of the battery and guarantee the life of the heating wire by controlling the maximum power supply time of the battery by step S8.

Preferably, the method further includes a step S10 that in the standby state, if the control module does not detect a high voltage signal from the switch module for any one switching on, the intelligent controller enters a sleep state to wait to be woken up by a high voltage signal from the switch module to the control module. It is also beneficial to save the capacity of the battery for the intelligent controller by entering the sleep state during the standby state.

Further described herein is an electronic cigarette, including an intelligent controller, the intelligent controller including a switch module, a voltage acquisition module, a control module, a display module and a battery; the switch module, configured to send a high voltage signal to activate the intelligent controller; the voltage acquisition module coupled to a heating wire, configured to acquire a terminal voltage of the heating wire; the control module coupled to the switch module and the voltage acquisition module respectively, configured to, after receiving the high voltage signal from the switch module, send a control signal to the voltage acquisition module to make the voltage acquisition module acquire a terminal voltage of the heating wire, detect whether the heating wire of an atomizer is in a short-circuit condition, an open-circuit condition, or a normal condition based on a type of the acquired signal from the voltage acquisition module, and output a detection result; the display module electrically connected to an output of the control module, configured to digitally display whether the heating wire is in a short-circuit condition, an open-circuit condition or a normal condition, so that a user can observe current condition of the heating wire directly; and the battery electrically connected to the switch module, the voltage acquisition module, the control module, and the display module, respectively, configured to supply working voltages to the switch module, the voltage acquisition module, the control module, and the display module, respectively.

DETAILED DESCRIPTION OF THE INVENTION

Figure 1:
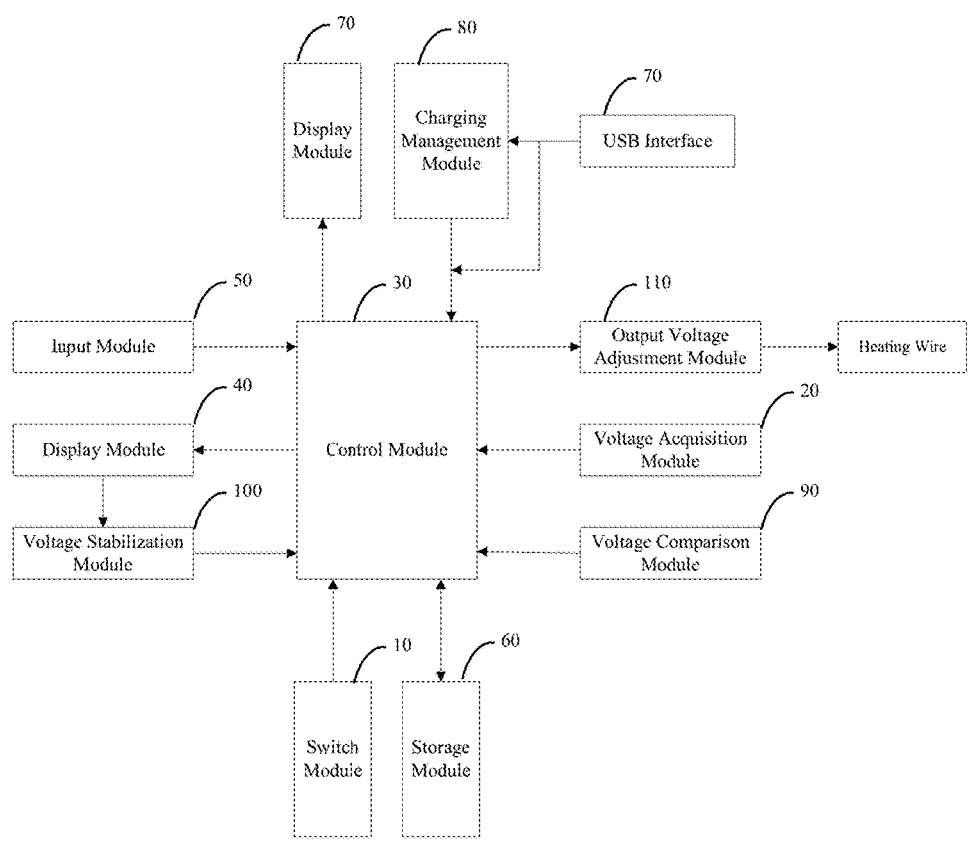
FIG. 1 is a circuit block diagram illustrating an intelligent controller according to one embodiment of the present invention.

Referring to FIGS. 1-11, an intelligent controller according to an embodiment of the present invention includes a switch module 10, a voltage acquisition module 20, a control module 30, a display module 40, a battery (not shown), an input module 50, a storage module 60, a USB interface 70, a charging management module 80, a voltage comparison module 90, a voltage stabilization module 100 and an output voltage adjustment module 110. These parts are described in more details below.

Figure 2:
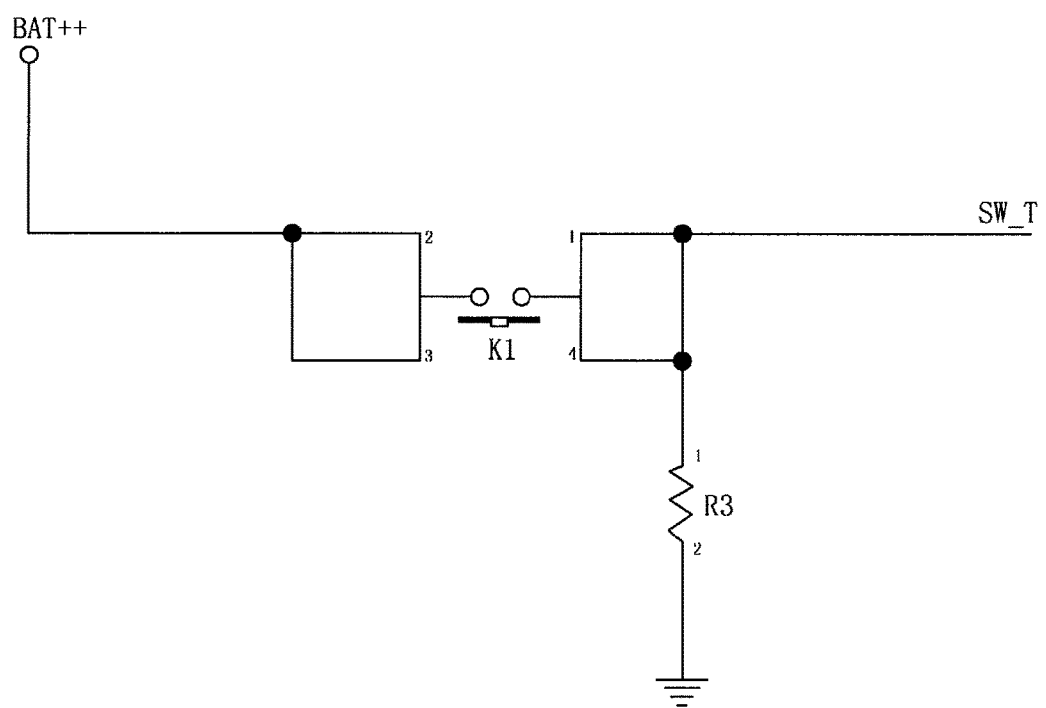
FIG. 2 is a circuit block diagram illustrating a switch module in the intelligent controller of FIG. 1 according to one embodiment of the present invention.

Referring to FIGS. 1 and 2, the switch module 10 is electrically connected with the control module 30, and the control module 30 detects whether the intelligent controller should be activated according to a high voltage signal from the switch module 10. The switch module 10 is preferably a key-pressing switch K1. There are two modes of operation of the switch module 10 recognized by the control module 30. The first mode is that when the switch module 10 has been switched on five times in a row for a set period of time in a shutdown condition, the intelligent controller may be activated if the control module 30 detects the continuous high voltage signals from the switch module 10, and the control module 30 outputs the menu to the display module. If the high voltage signals produced by switching on the key-pressing switch are not continuous, or the number of the high voltage signals does not reach a setting value, the high voltage signals will be considered to be produced by wrong operations and the intelligent controller cannot be activated. The second mode is that the user selects the start option in the menu after the intelligent controller is activated, and under this option, the intelligent controller is in a standby state ready for smoking. When the user sends a high voltage signal to the control module 30 by switching on the switch module 10 one time, the control module 30 outputs a control signal to make the battery supply power to the heating wire 120 after receiving the high voltage signal, and during the process, the control module 30 may record a start time for operating (a specific point of time to start to switch on the switch module 10), an operating time (the length of time for the switch module 10 being switched on), resistance of the heating wire 120 and so on. Because the intelligent controller outputs current to the heating wire 120 so that the heating wire 120 may be heated, this should be considered as one whiff regardless of actually smoking of the electronic cigarette by the user (the nicotine liquid may be introduced from the smoke cartridge to the heating wire 120 by the negative pressure created by the smoking of the user, and the nicotine liquid may be atomized by the heat from the heating wire 120). That is, once there is a current flowing to the heating wire 120 the event may be considered as a smoking by the user, regardless if the nicotine liquid reaches the atomizer and is atomized by the heating wire 120 of the atomizer. The above description shows two important functions of the switch module 10. One is to activate the intelligent controller, and the other is to use as an actual operation of smoking in the state of power-on. In addition, the switch module 10 also has a function of switching between the start options and the menu. For example, when the electronic cigarette is in the smoking mode, if the user switches on the switch module 10 five times in a set period of time, the control module 30 will switch the current interface to the menu interface.

Figure 3:
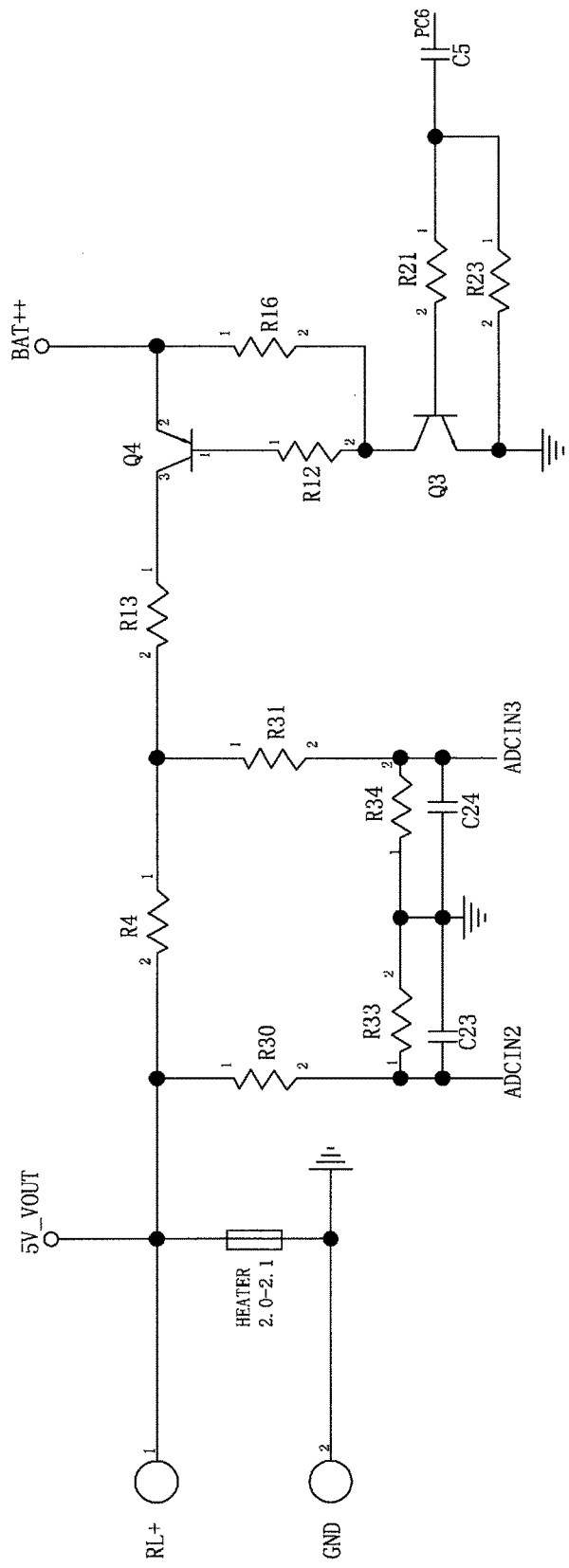
FIG. 3 is a circuit block diagram illustrating a voltage acquisition module in the intelligent controller of FIG. 1 according to one embodiment of the present invention.

Referring to FIGS. 1 and 3, the voltage acquisition module 20 is coupled to a heating wire 120, configured to acquire a terminal voltage of the heating wire 120. The voltage acquisition module 20 comprises a first transistor Q3, a second transistor Q4, a first resistor R13 and a second resistor R4. The base of the first transistor Q3 is coupled to the control module 30, a voltage division and filter circuit is connected between the first transistor Q3 and the control module 30, the voltage division and filter circuit comprises a capacitor C5, a resistor R21 and a resistor R23, one end of the resistor R23 is connected in parallel with one end of the resistor R21 and then in series with the capacitor C5, the other end of the resistor R21 is connected to the base of the first transistor Q3, and the other end of the resistor R23 is connected to the ground. The emitter of the first transistor Q3 is connected to the ground, the collector of the first transistor Q3 is connected to the base of the second transistor Q4, and the collector of the first transistor Q3 is coupled to the base of the second transistor Q4 via the resistor R12. The collector of the first transistor Q3 and the emitter of the second transistor Q4 are both connected to the battery. The collector of the second transistor Q4 is connected to one end of the first resistor R13, the other end of the first resistor R13 is connected to one end of the second resistor R4, the other end of the second resistor R4 is a coupling end for the heating wire 120 of the atomizer of the electronic cigarette. The heating wire 120 is connected between the second resistor R4 and the ground, and both ends of the second resistor are coupled to the control module 30, in order to send the acquired result to the control module 30. A voltage division and filter circuit is connected to both ends of the second resistor R4, which comprises a resistor R30, a resistor R31, a resistor R33, a resistor R34, a capacitor C23 and a capacitor C24. The voltage acquisition module 20 is operated as follows:

when the switch module 10 has been continuously switched on five times in 1.5 seconds, the control module 30 will detect the condition of the heating wire 120 at first, and the detection includes: a control pin PC6 of the control module 30 sends a control signal to turn on the first transistor Q3 and the second transistor Q4 in turn, and the current of the battery flows through the second transistor Q4 and flows through the first resistor R13 and the second resistor R4 in turn. If the heating wire 120 is in a short-circuit condition, the voltage drop between both ends of the heating wire 120 is zero, the end of the second resistor R4 connected to the heating wire 120 has a voltage of zero, and the control module 30 can detect the heating wire 120 is in a short-circuit condition after acquiring that the voltage of the end of the second resistor R4 connected to the heating wire 120 is zero. If the heating wire 120 is in an open-circuit condition, there is no current flowing through the circuit, both ends of the second resistor R4 have a same voltage, and the control module 30 can detect that the heating wire 120 is in an open-circuit condition after acquiring that both ends of the second resistor R4 have a same voltage. If the heating wire 120 is in a normal condition, there is a current flowing through the circuit, the voltage drop between both ends of the heating wire 120 is nonzero, the end of the second resistor R4 connected to the heating wire 120 has a nonzero voltage, and the control module 30 can calculate the resistance value of the heating wire 120.

Figure 4:
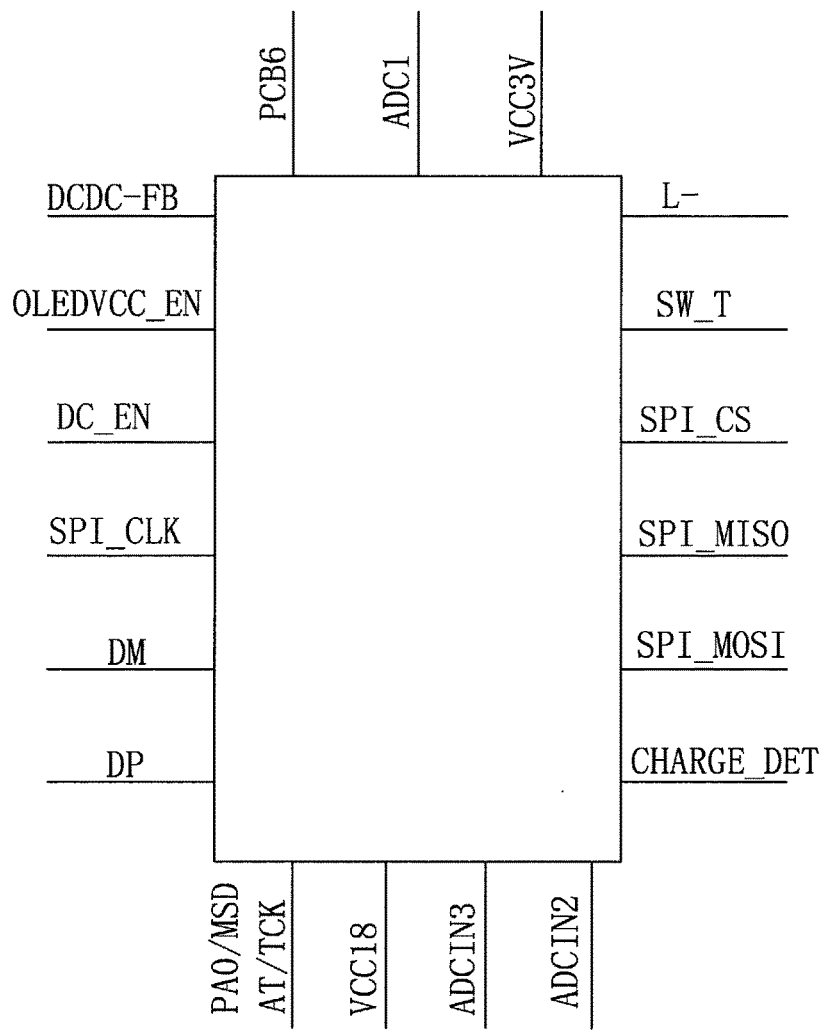
FIG. 4 is a circuit block diagram illustrating a control module in the intelligent controller of FIG. 1 according to one embodiment of the present invention.

Referring to FIGS. 1 and 4, the control module 30 may be a control device, such as a microcontroller or a digital signal processor (DSP). The control module 30 is configured to send a control signal to the voltage acquisition module 20 to make the voltage acquisition module 20 acquire a terminal voltage of the heating wire 120, after receiving the high voltage signal from the switch module 10, detect whether the heating wire 120 of an atomizer is in a short-circuit condition, an open-circuit condition or a normal condition, according to the type of the acquired signal from the voltage acquisition module 20, and output a detection result. An electronic cigarette menu is built in the control module 30, and parameters of electronic cigarette are stored in the control module 30. The control module 30 digitally outputs the electronic cigarette menu and the parameters after the intelligent controller is activated.

Figure 5:
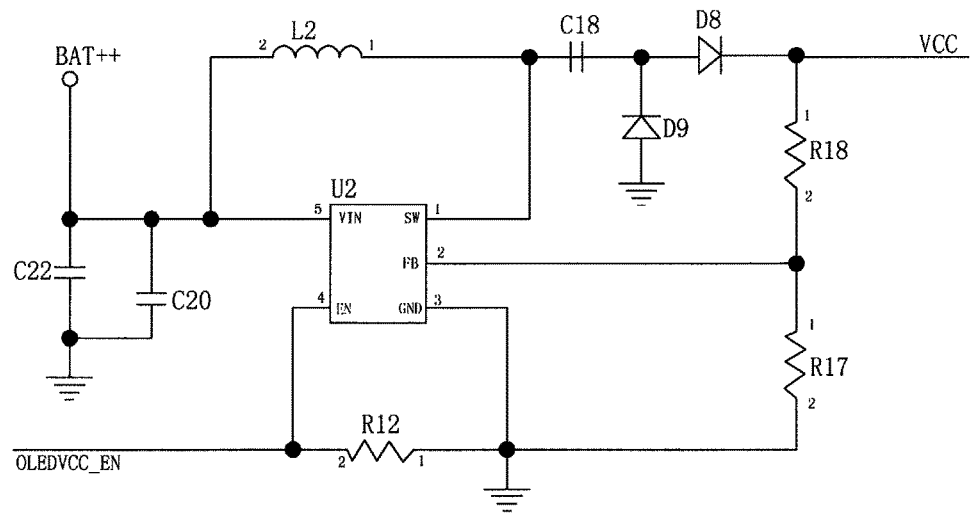
FIG. 5 is a circuit block diagram illustrating a switching voltage booster of the display module in the intelligent controller of FIG. 1 according to one embodiment of the present invention.

Referring to FIGS. 1 and 5, the display module 40 is electrically connected to an output of the control module 30. The display module 40 is configured to digitally display whether the heating wire 120 is in a short-circuit condition, an open-circuit condition or a normal condition for users to observe the current condition of the heating wire 120 directly. The display module 40 is also configured to digitally display the electronic cigarette menu and the parameters for users to observe the active state of the electronic cigarette. The display module 40 includes a switching voltage booster U2 coupled to the control module 30. The switching voltage booster U2 outputs a voltage after acquiring a control signal output from the control module 30. The switching voltage booster U2 may be a TPS61040 chip. The display module 40 also includes a display screen (not shown) coupled to an output of the switching voltage booster, configured to display the electronic cigarette menu and the values of the parameters of the electronic cigarette output from the control module 30 after acquiring the output voltage of the switching voltage booster. In the embodiment, the display screen is an OLED display screen. The switching voltage booster U2 supplies necessary power to the display screen, for example, via a 28 pins interface. The display screen provides visualized operations in man-machine interaction, to improve operating convenience and bring higher intelligence.

Figure 6:
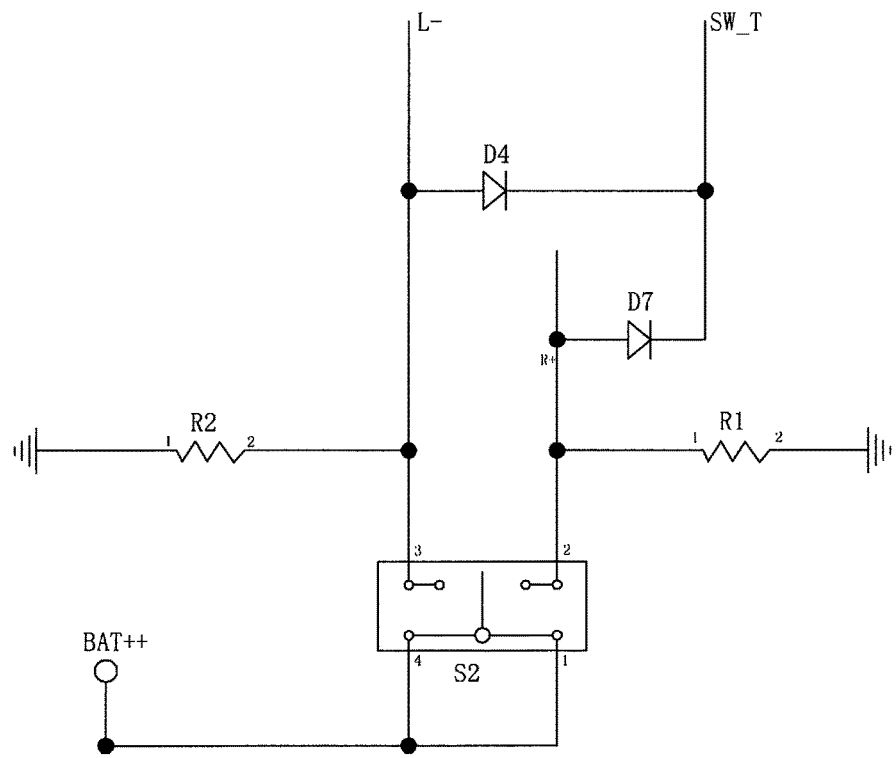
FIG. 6 is a circuit block diagram illustrating an input module in the intelligent controller of FIG. 1 according to one embodiment of the present invention.
Figure 7:
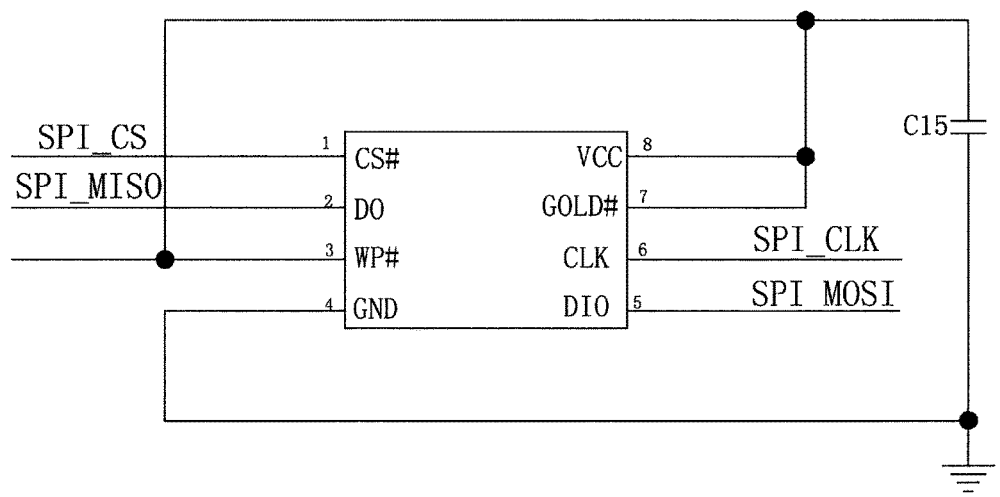
FIG. 7 is a circuit block diagram illustrating a storage module in the intelligent controller of FIG. 1 according to one embodiment of the present invention.

Referring to FIGS. 1, 6 and 7, the input module 50 is electrically connected to an input of the control module 30. The user sends a signal to the control module 30 to select options in the electronic cigarette menu via the input module 50, and sends instructions to the control module 30 to adjust the parameters after viewing the parameters of the electronic cigarette, wherein the corresponding parameters are adjusted by the control module 30. The storage module 60 is coupled to an output of the control module 30. The control module 30 stores data produced during smoking in the storage module 60. The input module includes a switch S2. The first switch end and the second switch end of the switch are coupled to the control module 30, respectively. The switch S2 is a single-pole double-throw switch, with an advantage that the switch can be driven by a knob such that the single-pole double-throw switch can be switched on to send a signal to the control module 30 when the knob rotates in any direction, which provides operating convenience for users. With the combination of the input module and the control module 30, the parameters in the control module 30, such as time, date and maximum number of whiffs of one day, can be modified, which improves man-machine interaction and brings higher intelligence to users. In the embodiment, the storage module 60 is a flash memory with a serial peripheral interface. The storage module 60 is an external memory of the control module 30. During smoking, the control module 30 can obtain the parameters of the state of the smoking based on an internal real time clock (RTC). The parameters of the current state, such as time for smoking, length of smoking, resistance of the heating wire 120 and output voltage, are stored in the storage module 60. Every whiff (the switch module 10 is switched on once in the state of power-on) will cause a piece of data containing the above information stored in the storage module 60. The data can be provided to a PC via a corresponding interface for analysis and the statistics. The data stored in the storage module 60 also can be fetched to the display module 40 via the input module for users to observe.

The battery (not shown) is electrically connected to the switch module 10, the voltage acquisition module 20, the control module 30 and the display module 40, respectively, and supplies working voltages to the switch module 10, the voltage acquisition module 20, the control module 30 and the display module 40, respectively. In addition, the battery also supplies working voltages to the charging management module 80, the voltage comparison module 90, the voltage stabilization module 100 and the output voltage adjustment module 110.

Figure 8:
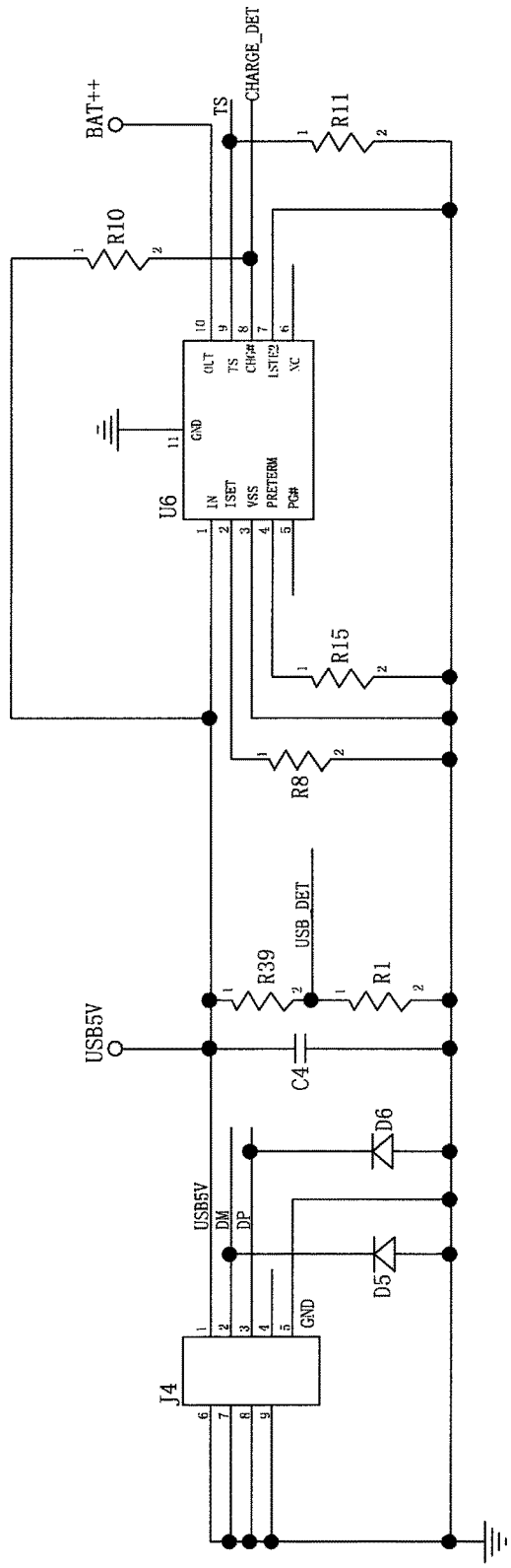
FIG. 8 is a circuit block diagram illustrating a connection between the USB interface and the charging management module in the intelligent controller of FIG. 1 according to one embodiment of the present invention.

Referring to FIGS. 1 and 8, the USB interface 70 (J4 in FIG. 8) is electrically connected to the control module 30. The USB interface 70 is configured to use as an interface for data interaction between the control module 30 and an intelligence terminal device. The USB interface 70 is also coupled to a charging management module 80 which is also coupled to the control module 30 and the battery. The control module 30 can communicate with the intelligence terminal device through the USB interface 70 coupled to the intelligence terminal device, to send the data stored in the storage module 60 and produced during smoking to the intelligence terminal device. The intelligence terminal device can carry out a further analysis on the data, so the user can see the service conditions of the electronic cigarette more intuitively. The service conditions include daily conditions, weekly conditions and monthly conditions. These service conditions can be displayed on the intelligence terminal device in forms of graphs. When an external power is connected to the USB interface 70, the USB interface 70 can transmit the voltage of the external power to the charging management module 80 (U6 in FIG. 8), and the battery can be recharged via the charging management module. In the embodiment, the charging management module 80 can be a BQ24040 chip, the pin 1 of the chip is coupled to the output of the USB interface 70, the pin 10 of the chip is coupled to the battery, and the pin 8 of the chip is coupled to the control module 30.

Figure 9:
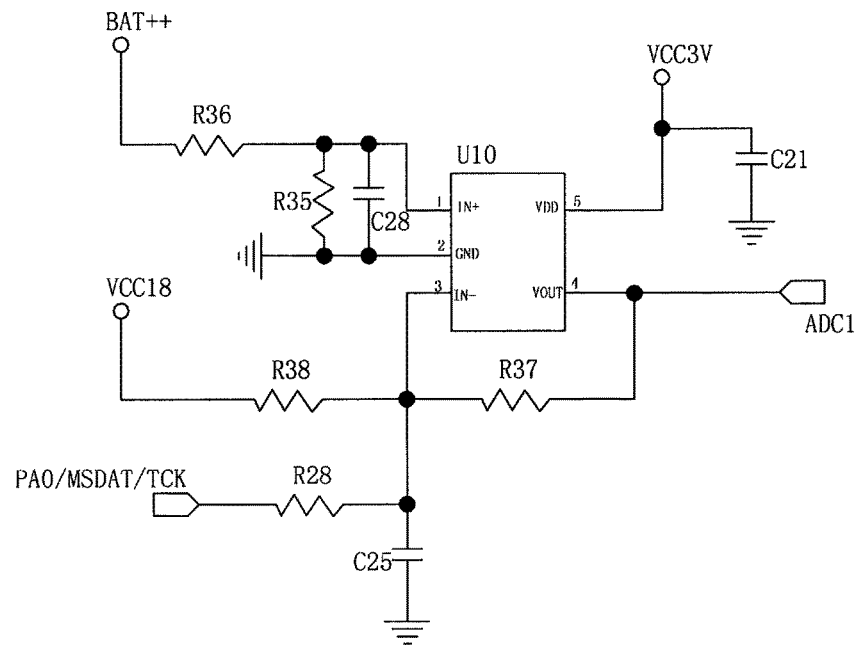
FIG. 9 is a circuit block diagram illustrating a voltage comparison module in the intelligent controller of FIG. 1 according to one embodiment of the present invention.

Referring to FIGS. 1 and 9, the voltage comparison module 9 is coupled to the control module 30. The voltage comparison module 9 compares an acquired voltage of the battery with a reference voltage to obtain a voltage difference, amplifies the voltage difference after comparing, and sends the amplified voltage difference to the control module 30. The voltage comparison module 9 comprises a MCP6001 chip and a peripheral circuit. The voltage comparison module 9 can compare the voltage of the battery with the reference voltage of 1.8V, amplify the voltage difference after comparing, and send the amplified voltage difference to an AD sampling interface, so that the control module 30 can obtain a precise voltage of the battery. The voltage comparison module 9 offsets the lack of precision of the AD sampling interface of the control module 30. The voltage of the battery can be output to the display module 40 via the control module 30, so that users can know the voltage of the battery accurately when the intelligent controller is at work.

Figure 10:
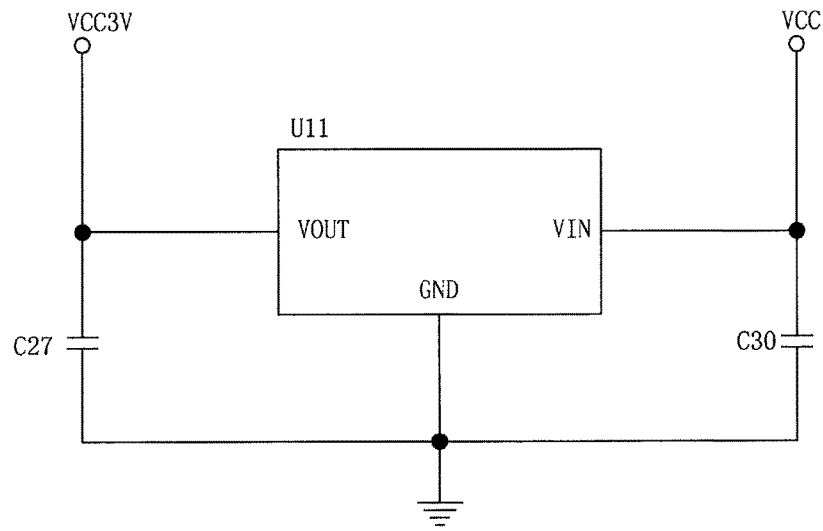
FIG. 10 is a circuit block diagram illustrating a voltage stabilization module in the intelligent controller of FIG. 1 according to one embodiment of the present invention.

Referring to FIGS. 1 and 10, the voltage stabilization module 100 is coupled to an output of the switching voltage booster U2. The voltage stabilization module 100 converts the voltage from the switching voltage booster and provides a stable voltage to the control module 30. In the embodiment, the voltage stabilization module 100 is a XC620P332M chip. Because the intelligent controller according to the present invention has a high current (greater than 1 A) at work, there is a great voltage drop in the battery, and when the voltage of the battery is low, the voltage drop can cause the voltage of the battery too low, making the control module 30 reset. The function of the voltage stabilization module 100 is to generate a steady voltage of 3.3V to power the control module 30, so as to avoid the problem of the reset of the control module 30 when the heating wire 120 is at work. If there is no voltage stabilization module 100 in the intelligent controller according to the present invention, the control module 30 can be reset when the battery operates at about 3.6V. Because of the voltage stabilization module 100, the intelligent controller will still work even if the voltage of the battery is decreased to 3.3V or below.

Figure 11:
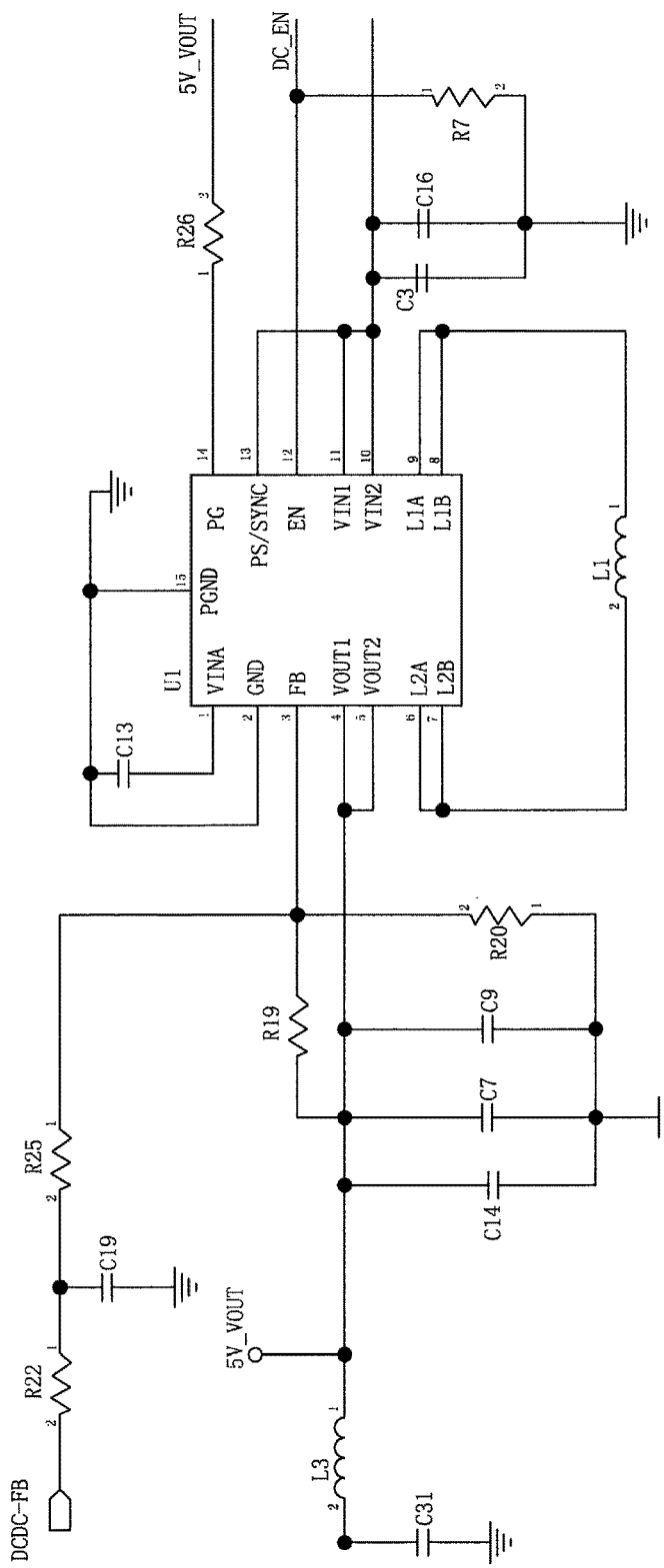
FIG. 11 is a circuit block diagram illustrating an output voltage adjustment module in the intelligent controller of FIG. 1 according to one embodiment of the present invention.

Referring to FIGS. 1 and 11, the output voltage adjustment module 110 is coupled to the control module 30, configured to adjust a voltage output from the output voltage adjustment module 110 to the heating wire 120 of the electronic cigarette to a voltage defined by a user, according to a pulse width modulation signal output from the control module 30 based on a signal for adjusting the output voltage from the input module. The output voltage adjustment module 110 includes a switching buck-boost converter U1, a switch pin of the switching buck-boost converter is coupled to an output of the control module 30, and a reference voltage pin of the switching buck-boost converter is coupled to an output of the pulse width modulation signal of the control module 30. When the control module 30 detects that the heating wire 120 is in a normal condition, the user can define the output voltage by the input module. Because the voltage of the reference voltage pin 12 of the switching buck-boost converter U1 is constant at 0.5V, and the output voltage of the pin 4 of the switching buck-boost converter U1 can be changed by a pulse width modulation signal to make the voltage of the pin 3 stabilize at 0.5V, the output voltage of the switching buck-boost converter U1 can be changed by the pulse width modulation signal output from the control module 30 according to the voltage signal input defined by the user.

Figure 12:
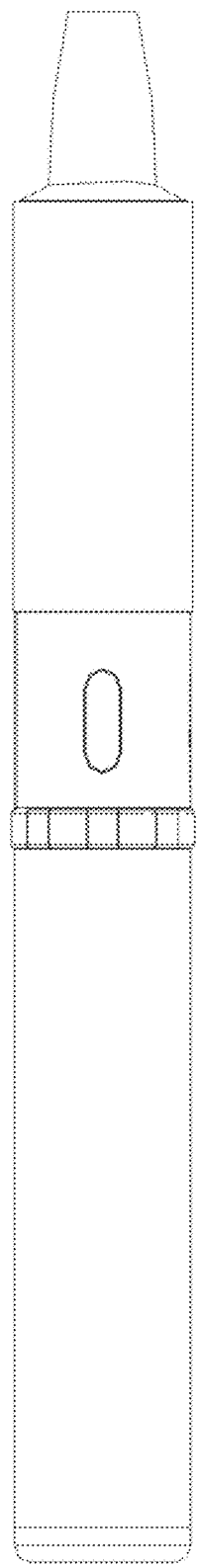
FIG. 12 is a schematic diagram illustrating an electronic cigarette according to one embodiment of the present invention.

Referring to FIGS. 1 and 12, the electronic cigarette according to an embodiment of the present invention includes an atomizer, a smoke cartridge and the above intelligent controller for electronic cigarette. The intelligent controller is coupled to the atomizer. The electronic cigarette works as follows: when the switch module 10 has been switched on five times in a row for a set period of time in a shutdown mode, the intelligent controller may be activated if the control module 30 detects the continuous high voltage signals from the switch module 10, and the control module 30 outputs the menu to the display module 40. The user selects the start option in the menu (other options can be selected to view, set or modify the parameters) after the intelligent controller is activated, and under this option, the intelligent controller is in a standby state ready for smoking. When the user sends a high voltage signal to the control module 30 by switching on the switch module 10 one time, the control module 30 outputs a control signal to make the battery supply power to the heating wire 120 after receiving the high voltage signal, the nicotine liquid in the smoke cartridge is introduced to the atomizer by the negative pressure created by the smoking of the user, the nicotine liquid is atomized by the atomizer, and the smoke produced reaches the mouth of the user. During the process, the control module 30 may record a start time for operating (a specific point of time to start to switch on the switch module 10), an operating time (a length of time for the switch module 10 being switched on), resistance of the heating wire 120 and so on, and the intelligent controller outputs current to the heating wire 120 such that the heating wire 120 may be heated. The special nature of the electronic cigarette according to the present invention is that this should be considered as one whiff regardless of actually smoking of the electronic cigarette for the user (the nicotine liquid may be introduced from the smoke cartridge to the heating wire 120 by the negative pressure created by the smoking of the user, and the nicotine liquid may be atomized by the heat from the heating wire 120). That is, once there is a current flowing to the heating wire 120, the event may be considered as a smoking by the user, regardless if the nicotine liquid reaches the atomizer and is atomized by the heating wire 120 of the atomizer.

Figure 13:
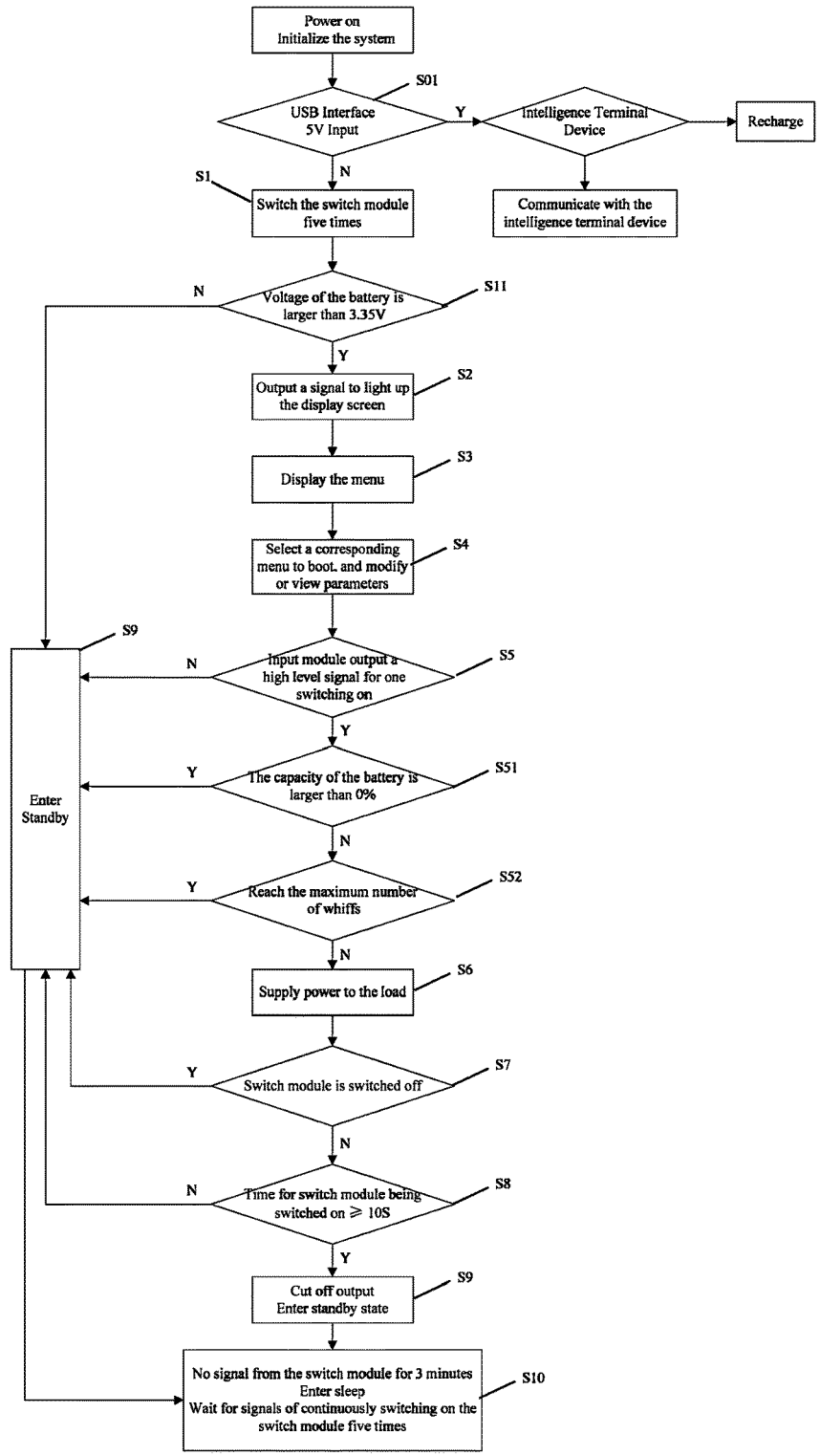
FIG. 13 is a flow diagram illustrating an intelligent control method for electronic cigarette according to one embodiment of the present invention.

Referring to FIG. 13, an intelligent control method of an electronic cigarette according to an embodiment of the present invention includes:

step Q1, detecting, by the control module 30, whether the USB interface 70 is connected with a power supply unit with an output voltage, for example, of 5V, if the result of the detection is no, then proceeding to S1, and if the result of the detection is yes, proceeding to step Q2; and step Q2, determining, by the control module 30, whether the power supply unit connected with the USB interface 70 is an intelligence terminal device, if the result of the determination is no, then recharge the battery, and if the result of the determination is yes, establish a communication with the intelligence terminal device.

Step S1, sending, by a switch module 10, a high voltage signal of startup to a control module 30, wherein the way to send a valid activating signal from the switch module 10 by sending a high voltage signal is by switching on the switch module 10 B times in A second(s), and the time for one switching on is less than C second(s). After the step S1 is performed, perform the step S11.

Step S11, detecting, by the control module 30, whether the voltage of the battery is larger than N volt, if the result of the detection is no, enter a standby state, and if the result of the detection is yes, proceeding to S2. In this way, the electronic cigarette may only be used when the capacity of the battery is larger than a certain value, which helps to ensure sufficient atomization during use and life of the battery.

Step S2, receiving, by the control module 30, the high voltage signal of startup from the switch module 10, sending a control signal to a voltage acquisition module 20 to make the voltage acquisition module 20 acquire a terminal voltage of the heating wire 120, detecting whether the heating wire 120 of an atomizer is in a short-circuit condition, an open-circuit condition or a normal condition, according to the type of an acquired signal from the voltage acquisition module 20, and outputting a detection result. In the step S2, a built-in electronic cigarette menu in the control module 30 can be output to the display module 40, while the condition of the heating wire 120 of the atomizer that the heating wire 120 is in a short-circuit condition, an open-circuit condition or a normal condition is output to the display module 40.

step S3, digitally displaying, by a display module 40, an output signal from the control module 30 to show whether the heating wire 120 is in a short-circuit condition, an open-circuit condition or a normal condition, and displaying by the display module 40 the electronic cigarette menu, in order to let the users observe the current condition of the heating wire 120 directly.

Step S4, selecting, via an input module, start options in the menu, viewing parameter values in other options in the menu, or sending a signal to the control module 30 to adjust the parameter, wherein, the control module 30 can adjust the corresponding parameter values after receiving the signal for adjustment from the input module, and output the adjusted parameter values to the display module 40 for display.

Step S5, if the control module 30 does not detect a high voltage signal from the switch module 10 for one switching on in D second(s), the control module 30 controlling the intelligent controller to enter a standby state, and if the control module 30 detect a high voltage signal from the switch module 10 for one switching on in D second(s), then proceeding to S51.

Step S51, detecting, by the control module 30, whether the capacity of the battery is larger than 0%, if the result of the detection is no, proceeding to perform a shutdown, and if the result of the detection is yes, proceeding to step S52.

Step S52, parameters of the electronic cigarette in the control module 30 include the parameter of the maximum number of whiffs of one day, the control module 30 detects whether the number of whiffs of the day reaches the maximum number of whiffs, if the detected result of S52 is yes, then the control module 30 controls the intelligent controller to enter a standby state, and if the detected result of S51 is no, then proceeding to S6.

Step S6, the control module 30 controlling a voltage adjustment module to supply power to a load such that the user can smoke the electronic cigarette. After supplying power to the load of step S6, perform the step S11.

Step S7, detecting, by the control module 30, whether the switch module 10 is switched off, if the result of the detection is yes, the intelligent controller enters the standby state, and if the result of the detection is no, proceeding to step S8.

Step S8, detecting, by the control module 30, whether the switch module 10 is switched on for F second(s), if the result of the detection is no, the intelligent controller enters the standby state, and if the result of the detection is yes, proceeding to step S9.

Step S9, outputting, by the control module 30, a control signal to stop supplying power to the load and the intelligent controller enters a standby state.

Step S10, in the standby state, if the control module 30 does not detect a high voltage signal from the switch module 10 used for any switching on, the intelligent controller enters a sleep state to wait to be woken up by a high voltage signal from the switch module 10 to the control module 30.

I claim:

1. A controller, comprising:
    a switch that sends a high voltage signal to activate the controller;
    a voltage detector that acquires a terminal voltage of an external heating wire;
    a control device coupled to the switch and the voltage detector, respectively, configured to send, after receiving the high voltage signal from the switch, a control signal to the voltage detector by sequentially switching on a plurality of transistors to make the voltage detector acquire the terminal voltage of the external heating wire, detect whether the external heating wire is in a normal or an abnormal condition based on a type of the acquired signal from the voltage detector, and output a detection result;
    a display electrically connected to an output of the control device, configured to digitally display whether the external heating wire is in the normal or the abnormal condition, such that a user directly observes the condition of the external heating wire; and
    a battery electrically connected to the switch, the voltage detector, the control device, and the display, respectively, that supplies working voltage power to the switch, the voltage detector, the control device, and the display, respectively.

2. The controller of an electronic cigarette of claim 1, wherein the control device is configured to store a built-in electronic cigarette menu and store parameters of an electronic cigarette, the controller further comprising:
    an input device electrically connected to an input of the control device and configured to receive instructions to select options from the electronic cigarette menu, sending instructions to the control device after viewing the parameters of the electronic cigarette, such that the control device is configured to adjust the parameters; and
    a storage device coupled to an output of the control device and configured to store data produced by the controller.

3. The controller of an electronic cigarette of claim 2, further comprising a Universal Serial Bus (USB) interface electrically connected to the control device, wherein the USB interface is configured to be an interface for data interaction between the control device and an intelligence terminal device.

4. The controller of an electronic cigarette of claim 3, further comprising a charging management device coupled to the USB interface, wherein the charging management device is electrically connected to the control device and the battery, respectively.

5. The controller of an electronic cigarette of claim 1, further comprising a voltage comparison device, wherein the voltage comparison device compares an acquired voltage of the battery with a reference voltage to obtain a voltage difference, amplifies the voltage difference after comparing, and sends the amplified voltage difference to the control device.

6. The controller of an electronic cigarette of claim 5, wherein the display comprises:
    a switching voltage booster coupled to the control device, and configured to boost the voltage of the battery to output after acquiring an output signal of the control device; and
    a display screen coupled to an output end of the switching voltage booster, configured to display the condition of the external heating wire output from the control device after acquiring the output voltage of the switching voltage booster.

7. The controller of an electronic cigarette of claim 6, further comprising a voltage stabilization device coupled to an output of the switching voltage booster, wherein the voltage stabilization device converts the voltage from the switching voltage booster and provides a stable voltage to the control device.

8. The controller of an electronic cigarette of claim 7, further comprising an output voltage adjustment device coupled to the control device, wherein the control device is configured to output a pulse width modulation signal based on a signal from the input device for adjusting the output voltage of the output voltage adjustment device provided to the external heating wire of the electronic cigarette to a voltage value defined by the user.

9. The controller of an electronic cigarette of claim 8, wherein the output voltage adjustment device comprises a switching buck-boost converter having a switch pin coupled to an output of the control device and a reference voltage pin coupled to an output of the control device outputting the pulse width modulation signal.

10. An electronic cigarette, comprising:
    the controller according to claim 1; and
    an atomizer.

* * * * *